(12) United States Patent
Seki et al.

(10) Patent No.: US 11,121,487 B2
(45) Date of Patent: Sep. 14, 2021

(54) CAR WINDOW GLASS ASSEMBLY

(71) Applicant: Central Glass Company, Limited, Ube (JP)

(72) Inventors: Kohei Seki, Matsusaka (JP); Jun Hamada, Matsusaka (JP); Kazunori Furuhashi, Matsusaka (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 16/762,057

(22) PCT Filed: Aug. 21, 2018

(86) PCT No.: PCT/JP2018/030762
§ 371 (c)(1),
(2) Date: May 6, 2020

(87) PCT Pub. No.: WO2019/092947
PCT Pub. Date: May 16, 2019

(65) Prior Publication Data
US 2020/0343653 A1 Oct. 29, 2020

(30) Foreign Application Priority Data
Nov. 7, 2017 (JP) .............................. JP2017-214862

(51) Int. Cl.
*H01R 12/57* (2011.01)
*B23K 35/26* (2006.01)
(Continued)

(52) U.S. Cl.
CPC ............. *H01R 12/57* (2013.01); *B23K 35/26* (2013.01); *C22C 28/00* (2013.01); *H01R 4/625* (2013.01);
(Continued)

(58) Field of Classification Search
CPC ........ H01R 4/625; H01R 12/53; H01R 12/57; H05B 3/84; C22C 28/00; B23K 35/26
(Continued)

(56) References Cited

U.S. PATENT DOCUMENTS

| 2012/0222893 A1 | 9/2012 | Hwang et al. |
| 2013/0062119 A1 | 3/2013 | Schlarb et al. |

(Continued)

FOREIGN PATENT DOCUMENTS

| EP | 3 089 272 A1 | 11/2016 |
| JP | 1-158662 U | 11/1989 |

(Continued)

OTHER PUBLICATIONS

International Search Report (PCT/ISA/210) issued in PCT Application No. PCT/JP2018/030762 dated Nov. 20, 2018 with English translation (five pages).

(Continued)

*Primary Examiner* — Tremesha S Willis
(74) *Attorney, Agent, or Firm* — Crowell & Moring LLP

(57) ABSTRACT

A car window glass includes a glass plate having a conductor layer, a connection terminal, and a power line. The connection terminal includes metal-plate first and second join parts joined to the conductor layer via the first and second solder layers, a metal-plate bridge section connected to the first and second join parts and spaced apart from the conductor layer, and a fixing part for fixing the power line to a bridge section main surface. The power line extends from the fixing part along a glass plate main surface, and the side opposite of the side facing the glass plate main surface is free of the bridge section, and the starting point of the power line extending from the fixing part is positioned in the upper direction of a virtual line connecting the center portions of the first and second join parts with each other.

15 Claims, 3 Drawing Sheets

(51) Int. Cl.
*C22C 28/00* (2006.01)
*H01R 4/62* (2006.01)
*H01R 12/53* (2011.01)
*H05B 3/84* (2006.01)

(52) U.S. Cl.
CPC .............. *H01R 12/53* (2013.01); *H05B 3/84* (2013.01); *H05B 2203/016* (2013.01)

(58) Field of Classification Search
USPC ........................................................ 174/257
See application file for complete search history.

(56) References Cited

U.S. PATENT DOCUMENTS

| | | |
|---|---|---|
| 2015/0034704 A1 | 2/2015 | Mackin et al. |
| 2015/0236438 A1 | 8/2015 | Rateiczak et al. |
| 2016/0347028 A1 | 12/2016 | Kosaka et al. |
| 2018/0161905 A1 | 6/2018 | Mackin et al. |
| 2018/0330845 A1 | 11/2018 | Reul et al. |

FOREIGN PATENT DOCUMENTS

| | | |
|---|---|---|
| JP | 6-58557 U | 8/1994 |
| JP | 2013-530916 A | 8/2013 |
| JP | 2014-509944 A | 4/2014 |
| JP | 2014-96198 A | 5/2014 |
| JP | 2016-500575 A | 1/2016 |
| JP | 2016-52684 A | 4/2016 |
| JP | 2016-527689 A | 9/2016 |
| JP | 2016-222524 A | 12/2016 |
| WO | WO 2016/096248 A1 | 6/2016 |

OTHER PUBLICATIONS

Japanese-language Written Opinion (PCT/ISA/237) issued in PCT Application No. PCT/JP2018/030762 dated Nov. 20, 2018 (six pages).

Extended European Search Report issued in European Application No. 18876366.8 dated Oct. 22, 2020 (nine (9) pages).

Cover Page of EP 3 235 340 A0 published Oct. 25, 2017 (one (1) page).

CAR WINDOW GLASS ASSEMBLY

TECHNICAL FIELD

The present invention relates to a car window glass assembly formed by joining a conductor layer having a predetermined pattern of a car window glass plate formed with, on the main surface thereof, the conductive layer to a connection terminal via lead-free solder layers.

BACKGROUND OF THE INVENTION

A conductor layer for forming an antenna line and a heat wire to remove fogging on glass is formed on the main surface of a car window glass plate by, for example, silver print. The conductor layer is soldered to the terminal seat of a connection terminal, and the connection terminal is connected to various elements and a power source by power lines via harnesses. Recently, a lead-free solder material used for soldering has been required, and the use of a lead-free solder containing indium having a small influence on stress given to a glass plate and having the same flexibility as lead solder has been proposed, and a car window glass assembly has been proposed in which, by using the solder material, the connection terminal is connected to the conductor layer via join portions formed of a pair of solder layers having an interval therebetween (see, for example, patent documents 1 to 4).

PRIOR ART DOCUMENT(S)

Patent Document(s)

Patent Document 1: Japanese Patent Application Publication 2014-096198
Patent Document 2: Japanese Patent Application Publication 2014-509944
Patent Document 3: Japanese Patent Application Publication 2016-500575
Patent Document 4: Japanese Patent Application Publication 2016-052684

DISCLOSURE OF THE INVENTION

Problem(s) to be Solved by the Invention

Since the lead-free solder containing indium has flexibility, after soldering the connection terminal to the conductor layer, or when the car window glass assembly is subjected to a heat cycle test, a problem, such as occurrence of crack on the glass plate and the conductive layer, hardly occurs. On the other hand, joining strength in case where tensile stress by a power line is applied to solder join portions is insufficient. A car window glass assembly needs to have quality so as to pass not only the heat cycle test but also a heat soak test in accordance with "DIN EN ISO 16750-4-K at section 5.1.2.2". In particular, it is preferable to pass the heat soak test defined by German Association of the Automotive Industry (VDA). The heat soak test defined by the VDA is one in which the solder join portions are set under a temperature environment of 105° C., and while applying a voltage of 14 V to the conductor layer, the power line connected to the connection terminal is pulled in the direction vertical to the main surface of the glass plate with a load of 10 N for 96 hours. This test is one of standardized heat soak tests which is carried out under a severe condition.

However, it is difficult to pass the heat soak test defined by the VDA by the car window glass assembly equipped with the solder join portions made of the indium-containing lead-free solder. The cause of this can be considered that the melting point of the indium-containing lead-free solder is a low temperature of approximately 130° C., and when a tensile load is applied to the solder join portions in the direction vertical to the solder layers under a temperature environment of 105° C., by creep fatigue (the phenomenon in which, by applying a constant load to an object, the object is deformed over time) of the solder layers, the joining strength of the solder join portions deteriorates.

In a car window glass assembly equipped with solder join portions each made of an indium-containing lead-free solder which connect a connection terminal connected with a power line with a conductor layer formed on a glass plate main surface, an object of the present invention is to provide one which passes the heat soak test defined by the VDA by reducing tensile stress applied to the solder join portions of the connection terminal.

Means for Solving the Problem(s)

A car window glass assembly of the present invention includes:
a car window glass plate in which a conductor layer having a predetermined pattern is formed on a glass plate main surface;
a connection terminal connected to the conductor layer via a pair of join portions formed of a first solder layer and a second solder layer each made of an indium-containing lead-free solder; and
a power line fixed to the connection terminal,
wherein the connection terminal includes:
  a first join part made from a metal plate, and joined to the conductor layer via the first solder layer;
  a second join part made from a metal plate, and joined to the conductor layer via the second solder layer;
  a bridge section made from a metal plate, and connected to the first join part and the second join part so as to be spaced apart from the conductor layer; and
  a fixing part for fixing the power line to a bridge section main surface of the bridge section, and
wherein the power line extends from the fixing part along the glass plate main surface, and a starting point of the power line extending from the fixing part (that is, the distal end of a non-fixed part of the power line extending from the fixing part) is located at a position in an upper direction of a virtual line connecting a center portion of the first join part with a center portion of the second join part.

Since a part of the power line which extends from the fixing part is free of the connection terminal, a mode in which the power line is pulled in the direction vertical to the bridge section may occur. This mode is one of tensile modes, in which the strongest tensile stress is generated to the first solder layer and the second solder layer. In the heat soak test defined by the VDA, a mode in which the power line is pulled in the direction vertical to the bridge section is also included. By providing the above structure, the car window glass assembly of the present invention can pass the heat soak test defined by the VDA.

Effect(s) of the Invention

According to the present invention, when the power line becomes a state of being pulled in the direction vertical to the main surface of the glass plate, stress applied to the connection terminal is dispersed, and thereby the local generation of a strong stress can be suppressed. Consequently, it is possible to provide a car window glass assembly equipped with solder join portions each made of an indium-containing lead-free solder, which can pass the heat soak test defined by the VDA.

MODE FOR IMPLEMENTING THE INVENTION

Figure 1:
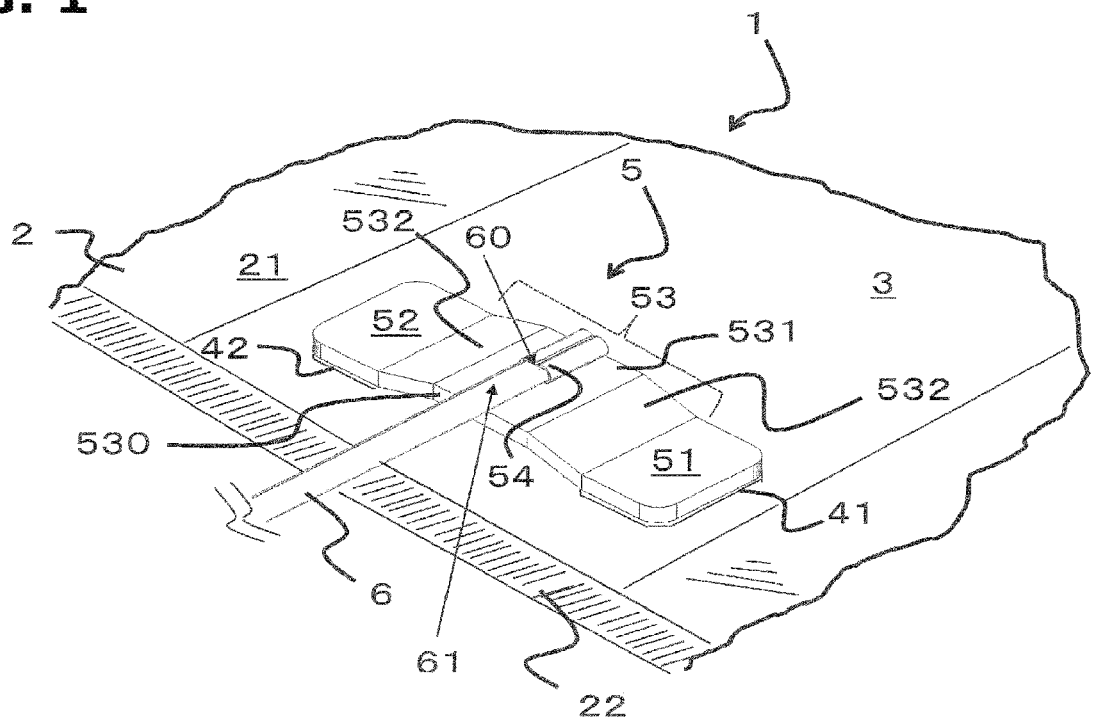
FIG. 1 is a drawing to explain a main part in a typical example of a car window glass assembly of the present invention.
Figure 2:
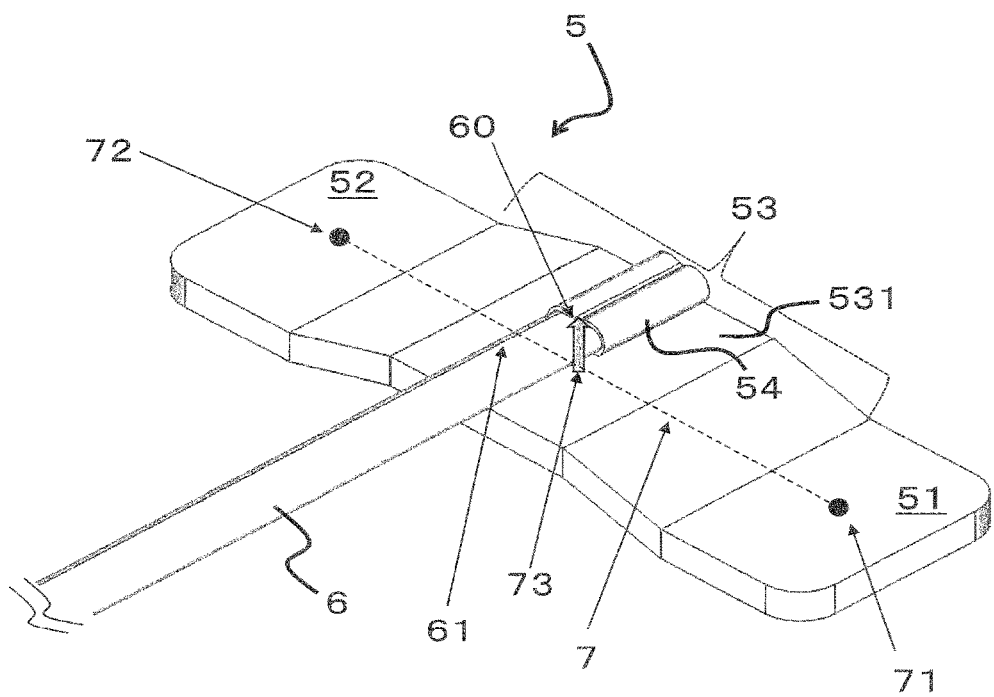
FIG. 2 is a drawing to explain a connection terminal in detail.
Figure 3:
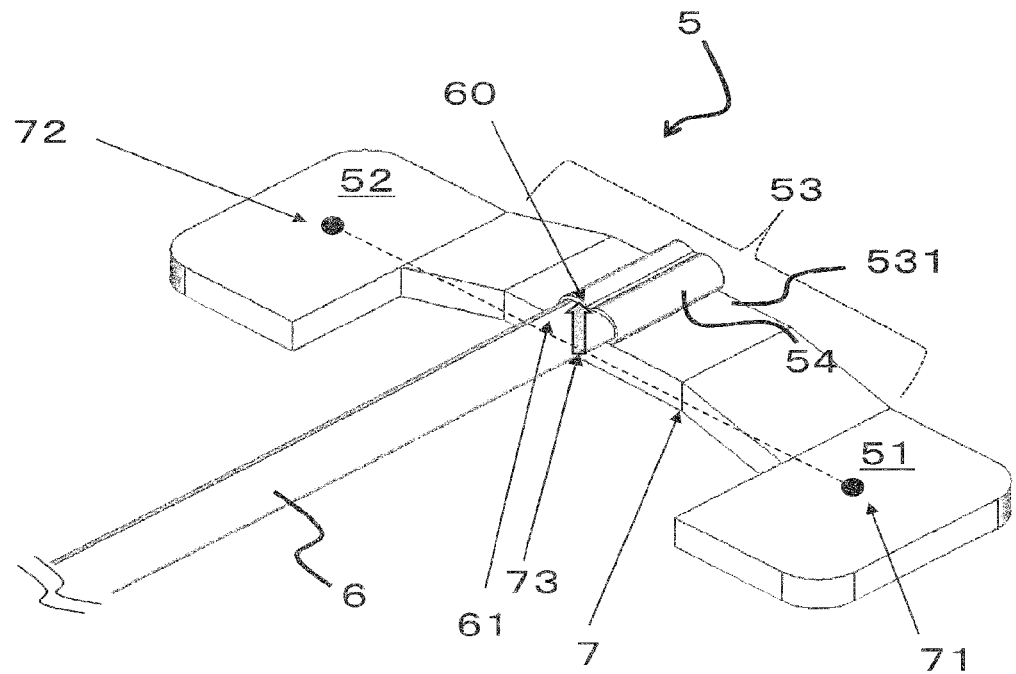
FIG. 3 is a drawing to explain a first derivative example of the connection terminal.
Figure 4:
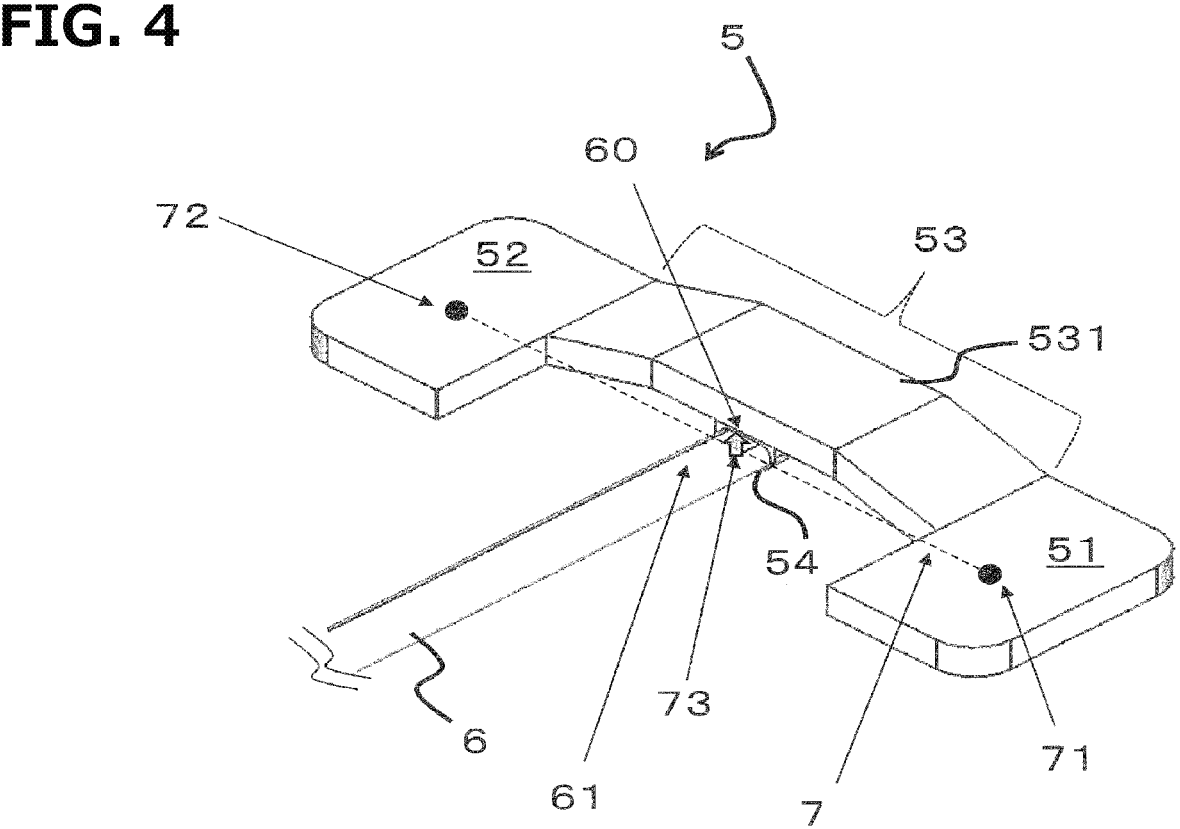
FIG. 4 is a drawing to explain a second derivative example of the connection terminal.
Figure 5:
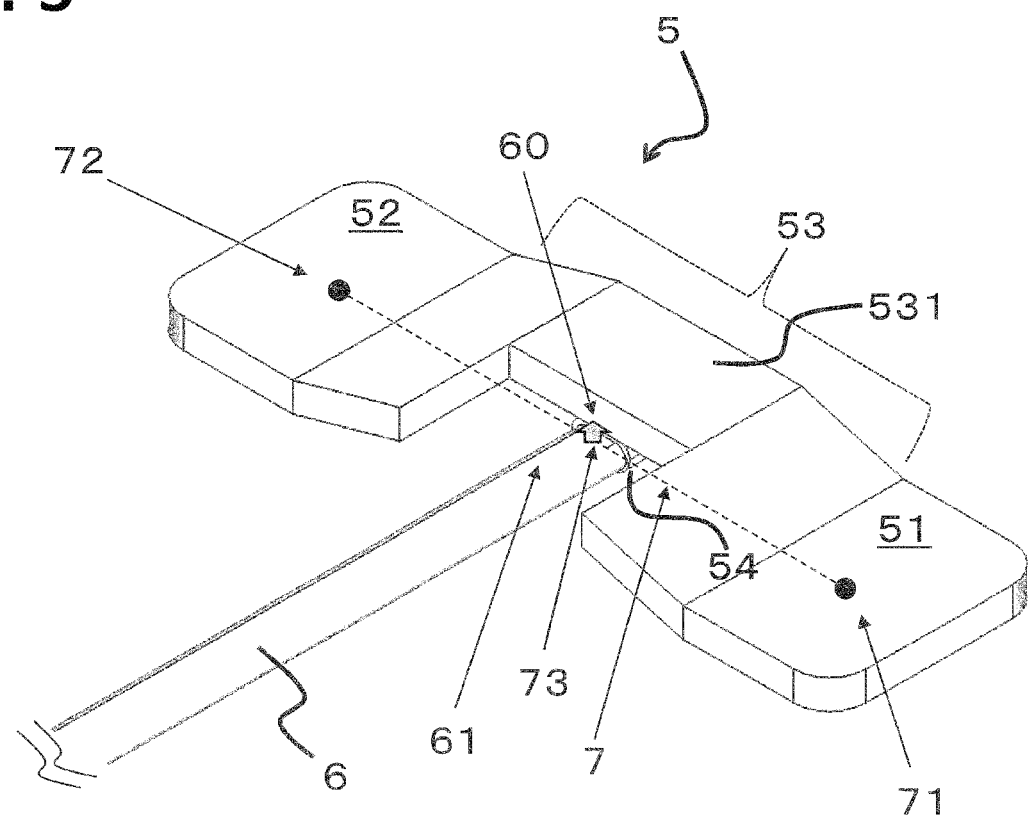
FIG. 5 is a drawing to explain a third derivative example of the connection terminal.

A car window glass assembly of the present invention will be explained with reference to the drawings. FIG. 1 is a drawing to explain a main part in a typical example of a car window glass assembly 1 of the present invention, main part in which a power line is fixed to a connection terminal. FIG. 2 is a drawing to explain the details of a typical example of the connection terminal to be used in the glass assembly 1. FIG. 3, FIG. 4 and FIG. 5 are drawings to respectively explain first, second and third derivative examples of the connection terminal in the category of the present invention.

The car window glass assembly 1 includes a car window glass plate 2 in which a conductor layer 3 having a predetermined pattern is formed on a glass plate main surface 21, a connection terminal 5 connected to the conductor layer 3 via a pair of join portions formed of a first solder layer 41 and a second solder layer 42 each made of an indium-containing lead-free solder, and a power line 6 fixed to the connection terminal.

The connection terminal 5 includes: a first join part 51 made from a metal plate, which is joined to the conductor layer 3 via the first solder layer 41;

a second join part 52 made from a metal plate, which is joined to the conductor layer 3 via the second solder layer 42;

a bridge section 53 made from a metal plate, which is connected to the first join part 51 and the second join part 52 so as to be spaced apart from the conductor layer 3; and a fixing part 54 for fixing the power line to a main surface 531 of the bridge section 53.

The power line 6 extends from the fixing part 54 along the glass plate main surface 21, and a starting point 60 of the power line 6 extending from the fixing part 54 is located at a position in the upper direction of a virtual line 7 connecting a center portion 71 of the first join part with a center portion 72 of the second join part.

Here, the upper direction indicates a direction separating from the glass plate main surface 21 in the vertical direction, and this vertical direction and the virtual line 7 intersect with each other. In the connection terminal 5, the width of the virtual line 7 is 4 mm, and based on this, the position of the starting point 60 is set.

In addition, in order to configure the car window glass assembly 1 which is capable of easily passing a heat soak test defined by the VDA, the starting point 60 may be located at a position in the upper direction of a middle point 73 of the virtual line 7 connecting the center portion 71 of the first join part with the center portion 72 of the second join part. In this case, the diameter of the middle point 73 is 2 mm, and the position of the starting point 60 is set. The middle point 73 is positioned in the middle of the virtual line 7, and in each of FIG. 2 to FIG. 5, an arrow showing a direction extending from the middle point 73 as a starting point toward the starting point 60 is drawn. In the heat soak test, the power line 6 is pulled in the direction shown by this arrow.

The glass plate 2 is equipped with the glass plate main surface 21 and a glass plate end surface 22. The glass plate 2 may have a curved shape so as to be used as a car window. In addition, it may have an area according to the shape of a car. Although the thickness of the glass plate 2 is not particularly limited, it is properly selected within the range of 0.3 mm to 6 mm. As a material to form the glass plate 2, a soda lime glass defined by ISO 16293-1 can be used. Even if the glass plate 2 is non-reinforced glass, the glass assembly 1 of the present invention satisfies the heat soak test defined by the VDA and a heat cycle test which is verified in the following examples. Therefore non-reinforced glass may be used as the glass plate 2. In addition, as the glass plate 2, laminated glass including non-reinforced glass may be used. Moreover, as the glass plate 2, not only non-reinforced glass, but also chemically reinforced glass may be used. Here, the non-reinforced glass in the present invention is one having, on the surface of the glass plate, a compressive stress of 50 MPa or less, which is formed by cooling the glass plate, which is bent by being heated in a furnace, in accordance with a temperature profile in a furnace, or a glass plate having, on the surface thereof, no compressive stress.

In the heat cycle test, it is preferable to pass a heat cycle test defined by German Association of the Automotive Industry (VDA) in accordance with "DIN EN ISO 16750-4-H at section 5.3.1.2". The heat cycle test defined by the VDA is one in which the solder join portions are set under a temperature cycle environment of −40° C. to 105° C. (60 cycles in total), and in a step in which temperature is raised and kept at 105° C., a voltage of 14 V is applied to the conductor layer.

The conductor layer 3 has a wiring pattern in accordance with purposes of, for example, an antenna and a heating element, and is equipped with a bus bar, which is electrically connected to the connection terminal 5, and a connection terminal part. The conductor layer 3 is preferably one made of a sintered body of silver or silver alloy and glass frit. For example, this sintered body can be formed in such a manner that a so-called silver paste containing particles of silver or silver alloy, glass frit and organic oil is applied to the glass plate main surface 21 with a method, such as screen printing, and then is heated at 500-700° C. In addition, the car window glass assembly 1 may be additionally equipped with a ceramic layer having, for example, black color between the conductor layer 3 and the glass plate main surface 21. The color ceramic layer is preferably one made of a sintered body of pigment and glass frit. For example, this sintered body can be formed in such a manner that a so-called color ceramic paste containing particles of pigment, glass frit and organic oil is applied to the glass plate main surface 21 with a method, such as screen printing, and then is heated at 500-700° C.

Each of the first solder layer 41 and the second solder layer 42 is made of an indium-containing lead-free solder. The melting point of this solder is a low temperature of 115° C. to 155° C., and it is therefore preferable particularly in case where the glass plate 2 is laminated glass, because a heating temperature at the time when the connection terminal 5 is soldered to the conductor layer 3 can be easily set to a temperature at which the thermal destruction of thermoplastic resin, such as PVB, used as an intermediate film of the laminated glass does not occur. When considering this, as the lead-free solder, one of which the melting point is 120° C. to 140° C., preferably one of which the melting point is 125° C. to 135° C. may be used. As an example of the lead-free solder, one can be cited which is made of an alloy containing 5-95 mass % of indium, 5-95 mass % of tin, 0-10 mass % of silver, 0-10 mass % of antimony, 0-10 mass % of copper, 0-10 mass % of zinc and 0-10 mass % of nickel. In addition, as a further preferable example, one can be cited which is made of an alloy containing 65-95 mass % of indium, 5-35 mass % of tin, 0-10 mass % of silver, 0-3 mass % of antimony, 0-5 mass % of copper, 0-5 mass % of zinc and 0-5 mass % of nickel.

To surely perform the joining between the conductor layer 3 and the connection terminal 5, each of the joining area of the conductor layer 3 and the first solder layer 41 and the joining area of the conductor layer 3 and the second solder layer 42 is 12 mm$^2$ to 48 mm$^2$, preferably 18 mm$^2$ to 36 mm$^2$. In addition, the area of each of the main surfaces of the respective first join part 51 and the second join part 52 is 12 mm$^2$ to 48 mm$^2$, preferably 18 mm$^2$ to 36 mm$^2$. In addition, its shape may be a rectangular shape or, if the required solder joining area is ensured, it may be an elliptic shape, a circular shape or a polygonal shape. The joining of the first and second solder layers 41 and 42, the conductor layer 3 and the first and second join parts is achieved by supplying heat generated from various heat sources to the vicinity of the solder join portions. As a heat source, a soldering iron, hot air and resistance welding, which have been conventionally known, can be cited. Specifically, the lead-free solder is melted and adheres to the side of each of the first and second join parts in the connection terminal 5, side which faces the glass plate main surface 21, in advance. After that, the joining is achieved in such a manner that, in a state in which the connection terminal 5 has been pressed to the glass plate main surface, a soldering iron of which the temperature of the iron tip is set at 200-300° C. is brought into contact with and held to the side of each of the first and second join parts which opposes to the side facing the glass plate main surface.

The first join part 51, the second join part 52 and the bridge section 53 are each made from a metal plate. As a material of the metal plate, copper, zinc, iron, nickel, tin, cobalt and chromium can be cited, or a metal plate made of an alloy containing two or more elements may be used. However, in general, from the point of view of conductivity and easiness of machining, a material, such as copper or brass, having excellent conductivity and capable of being easily machined is desirable. Each of the first join part 51, the second join part 52 and the bridge section 53 may be one formed by being machined from one metal plate. In addition, the connection terminal 5 may be one formed substantially of the first join part 51, the second join part 52 and the bridge section 53. Moreover, the connection terminal 5 may be one formed only of the first join part 51, the second join part 52 and the bridge section 53.

In addition, in the bridge section 53, a bridge section main surface is a part parallel to or substantially parallel to the glass plate main surface 21, and a side facing the glass plate main surface 21 is defined as a bridge section back-side main surface, and a side opposite of the bridge section back-side main surface is defined as a bridge section front-side main surface 531. Here, the area of each of the main surfaces may be 96 mm$^2$ to 8 mm$^2$, preferably 72 mm$^2$ to 12 mm$^2$. In addition, the shape of each of the main surfaces may be a rectangular or substantially rectangular shape. Moreover, the distance between the first join part 51 and the second join part 52 may be 16 mm to 4 mm, preferably 12 mm to 6 mm.

The bridge section 53 includes a ceiling part 530 equipped with the bridge section main surface, and pier parts 532 connected to the respective first and second join parts 51 and 52. Each of the pier parts 532 in the connection terminal 5 shown in FIG. 1 to FIG. 5 has a structure having an inclination from a corresponding one of the first and second join parts 51 and 52 toward the ceiling part 530 (that is, a structure which is not parallel to the main surface of the glass plate 2). In addition to this, the pier parts 532 may be formed extending from the respective first and second join parts 51 and 52 in the direction vertical to the main surface of the glass plate 2. Furthermore, the bridge section 53 may have a structure with no pier parts 532. In this case, it is preferable to provide the fixing part 54 to the bridge section front-side main surface 531.

There is a case where the thickness of each of the first join part 51, the second join part 52 and the bridge section 53 affects the heat soak test. When considering this, the thickness of each of them may be 0.3 mm to 2.0 mm, preferably 0.5 mm to 1.0 mm. Moreover, they may have the same thickness.

The fixing part 54 for fixing the power line 6 is provided to the bridge section front-side main surface 531 of the ceiling part 530 in the bridge section 53, or to the bridge section back-side main surface on the opposite side of the bridge section front-side main surface 531. In the following, a case where the fixing part 54 is provided to the bridge section front-side main surface 531 will be explained in detail. A mode in which the fixing part 54 is provided to the bridge section back-side main surface will be separately explained in detail. The fixing part 54 may have a size capable of fixing a front part (in the following, referred to as "distal end part") from the starting point 60 of the power line 6. As shown in FIG. 1 to FIG. 4, the structure of the fixing part 54 may be one for fixing the distal end part of the power line 6 by welding, such as resistance welding and brazing with brazing material, in addition to a structure with which the distal end part of the power line 6 can be caulked.

As a typical example of a structure with which the distal end part of the power line 6 can be caulked, a B-crimp can be cited. The power line 6 extends along the glass plate main surface 21. The direction in which the power line 6 extends is preferably a direction orthogonal to the virtual line 7 that is the direction of the glass plate end surface 22. As a material of the power line 6, although copper and aluminum having a low electric resistivity can be cited, copper which is further superior in electric conductivity and is inexpensive is preferable. In addition, as an example of a covering insulator, one having heat resistance to an assumed use temperature or higher may be used, and vinyl chloride and heat-resistant vinyl can be cited. The diameter of the power line may be set such that a current value which is assumed to flow to a heat wire formed to the main surface of the car window glass plate becomes an allowable current of the power line or lower. However, from the point of view of the flexibility of the power line, the diameter of the power line is preferably 1.25 sq. (AWG: 16) to 2.0 sq. (AWG: 14).

in the car window glass assembly 1, caused by the power line 6, tensile stress is applied to the solder join portions between the connection terminal 5 and conductor layer 3. In the glass assembly 1 of the present invention, since the starting point 60 of the power line 6 is located at a position in the upper direction of the virtual line 7 connecting the center portion 71 of the first join part with the center portion 72 of the second join part, and, moreover, in the power line 6, a side 61 opposite of the side facing the glass plate main surface 21 is free of the bridge section 53, the tensile stress is generated around the starting point 60. Consequently, the stress applied to the connection terminal 5 is dispersed, and thereby the local generation of a strong stress can be suppressed. Therefore, the glass assembly 1 of the present invention becomes one having excellent durability against the tensile stress in the solder join portions between the connection terminal 5 and the conductor layer 3.

Next, a derivative example of the connection terminal in the category of the present invention will be explained. FIG. 3 is a drawing showing a first derivative example of the connection terminal 5. The first derivative example of the connection terminal 5 differs from the typical example of the connection terminal 5 in FIG. 2 in that when viewed from the upper side of the connection terminal 5, a cut-out portion is formed to the bridge section 53. Also in this connection terminal 5, the action explained in the foregoing paragraph is generated, and the glass assembly 1 using this connection terminal 5 becomes excellent in durability against the tensile stress in the solder join portions between the connection terminal 5 and the conductor layer 3.

FIG. 4 is a drawing showing a second derivative example of the connection terminal 5. The second derivative example of the connection terminal 5 differs from the first derivative example of the connection terminal 5 in FIG. 3 in that the fixing part 54 is provided to the bridge section back-side main surface. In the power line 6, the opposite side 61 of the side facing the glass plate main surface 21 does not face the bridge section 53, and is free. Also in this connection terminal 5, the action explained above is generated, and the glass assembly 1 using this connection terminal 5 becomes excellent in durability against the tensile stress in the solder join portions between the connection terminal 5 and the conductor layer 3.

FIG. 5 is a drawing showing a third derivative example of the connection terminal 5. The third derivative example of the connection terminal 5 differs from the second derivative example of the connection terminal 5 in FIG. 4 in that when viewed from the upper side of the connection terminal 5, a cut-out portion is formed only to the bridge section main surface. Therefore, in the power line 6, the opposite side 61 of the side facing the glass plate main surface 21 does not face the bridge section 53, and is free. Also in this connection terminal 5, the action explained above is generated, and the glass assembly 1 using this connection terminal 5 becomes excellent in durability against the tensile stress in the solder join portions between the connection terminal 5 and the conductor layer 3.

Each of the second and third derivative example respectively shown in FIG. 4 and FIG. 5 has, as the fixing part 54, a structure with which the distal end part of the power line 6 can be caulked. In addition to the structure with which the caulking can be performed, as the fixing part 54, each of the second and third derivative examples may have a structure for fixing the distal end part of the power line 6 by welding, such as resistance welding and brazing with brazing material.

EXAMPLE(S)

in the following, Examples of the present invention will be explained in more detail.

Example 1

First, the main surface of a glass plate 21 (non-reinforced glass with a general car window size having a thickness of 2 mm) made from soda lime glass which was produced with a float method was coated with black ceramic paste with screen printing, and then was dried, following which it was coated with silver paste in a predetermined heat wire circuit pattern shape with screen printing, and then was dried. Next, the glass plate 21 applied with the black ceramic paste and the silver paste was heat-treated, and then a glass plate 2 formed with a conductor layer 3 was prepared.

A connection terminal 5 having a shape shown in FIG. 2 which was formed from a copper metal plate treated with nickel plating was prepared. In this connection terminal 5, a first join part 51, a second join part 52 and a bridge section 53 had the same thickness, and the thickness of each of them was 0.8 mm. In addition, the shape of each of them was a rectangular shape, the distance between the first join part 51 and the second join part 52 was 12 mm, the arear of a bridge section front-side main surface 531 was 36 $mm^2$, and the area of the main surface of each of the first join part 51 and the second join part 52 was 24 $mm^2$. When the main surfaces of the first join part 51 and the second join part 52 which face a glass plate main surface were defined as back surfaces, both of the back surfaces were positioned at the same level, and the bridge section front-side main surface 531 had a parallel relation to the level, and the main surface 531 was positioned at a height of 2 mm from the level.

A B-crimp-type fixing part 54 was provided on the main surface 531, and the longitudinal direction of the fixing part 54 had an orthogonal relation to the longitudinal direction of the bridge section 53. The starting point in the longitudinal direction of the fixing part 54 was a starting point positioned at a side of the bridge section 53, and the end point thereof was positioned at the middle in the width direction of the bridge section 53. In addition, this middle position was a position located in the upper direction of a middle point 73 of a virtual line 7 connecting a center portion 71 of the first join part with a center portion 72 of the second join part.

In a power line 6 made from a copper wire coated with vinyl chloride which had a diameter of 2.1 mm, a part where the copper wire was exposed was fixed to the fixing part 54. When the connection terminal 5 was soldered to the conductor layer 3, the longitudinal direction of the fixing part 54 had an orthogonal relation to the longitudinal direction of the bridge section 53, and the power line 6 was caulked so as to extend along the glass plate main surface 21. The starting point 60 of the power line 6 corresponded to the end point in the longitudinal direction of the fixing part 54. In addition, in the power line 6, a side 61 opposite of a side facing the glass plate main surface 21 was free of the bridge section 53.

A lead-free solder in an amount of 0.2 g which was made of an alloy containing 75 mass % of indium, 15 mass % of tin, 6 mass % of silver, 1 mass % of antimony, 1 mass % of copper, 1 mass % of zinc and 1 mass % of nickel was soldered to each of the main surfaces on the back-surface-sides of the first join part 51 and the second join part 52.

the connection terminal 5 was arranged on a base glass such that the solder soldered to the connection terminal 5 was disposed between the connection terminal 5 and the conductor layer 3. Next, a first solder layer 41 and a second solder layer 42 were formed through the remitting of the solder by the energization heating of the connection terminal 5, and then a sample simulating a car window glass assembly 1 including the connection terminal 5 connected thereto via a pair of join portions formed of the first solder layer 41 and the second solder layer 42 was obtained.

The sample obtained in the present Example was one satisfying the heat cycle test and the heat soak test defined by the VDA.

Example 2

A sample simulating the car window glass assembly 1 was obtained in the same process as Example 1 except that the connection terminal 5 was formed so as to have a shape shown in FIG. 3. The connection terminal 5 in the present Example had a structure in which a cut-out portion was formed, when viewed from the upper side of the connection terminal 5, and it was one following the sizes and the positional relation of the parts of the connection terminal 5 in Example 1, except that the starting point and the end point in the longitudinal direction of the fixing part 54 were positioned at respective sides of the bridge section 53. The sample obtained in the present Example was one satisfying the heat cycle test and the heat soak test defined by the VDA.

Example 3

A sample simulating the car window glass assembly 1 was obtained in the same process as Example 1 except that the connection terminal 5 was formed so as to have a shape shown in FIG. 4. The connection terminal 5 in the preset Example was one following the sizes and the positional relation of the parts of the connection terminal 5 in Example 2, except that the fixing part 54 was provided to the bridge section back-side main surface. The sample obtained in the present Example was one satisfying the heat cycle test and the heat soak test defined by the VDA.

Example 4

A sample simulating the car window glass assembly 1 was obtained in the same process as Example 1 except that the connection terminal 5 was formed so as to have a shape shown in FIG. 5. The connection terminal 5 was one following the sizes and the positional relation of the parts of the connection terminal 5 in Example 1, except that the starting point 60 of the power line 6 extending from the fixing part 54 was located at a position in the upper direction of the virtual line 7 connecting the center portion 71 of the first join part with the center portion 72 of the second join part, and was positioned at an end most portion in the line width of the virtual line 7. The sample obtained in the present Example was one satisfying the heat cycle test and the heat soak test defined by the VDA.

Comparative Example 1

A connection terminal 5 was prepared which followed the sizes and the positional relation of the parts of the connection terminal 5 in Example 1, except that the starting point and the end point in the longitudinal direction of the fixing part 54 were positioned at the respective sides of the bridge section 53 and the starting point 60 was positioned at a side of the bridge section 53. Then, a sample simulating the car window glass assembly 1 was obtained in the same process as Example 1. The sample obtained in the present Comparative Example was not one satisfying the heat soak test defined by the VDA.

Comparative Example 2

A connection terminal 5 was prepared which followed the sizes and the positional relation of the parts of the connection terminal 5 in Example 1, except that the fixing part 54 was provided on the bridge section back-side main surface. Then, a sample simulating the car window glass assembly 1 was obtained in the same process as Example 1. In the present Comparative Example, in the power line 6, the opposite side 61 of the side facing the glass plate main surface 21 faced the bridge section 53, and was not free of the bridge section 53. The sample obtained in the present Comparative Example was not one satisfying the heat soak test determined by the VDA.

EXPLANATION OF SIGNS

1: car window glass assembly
2: car window glass plate
21: glass plate main surface
22: glass plate end surface
3: conductor layer
41: first solder layer
42: second solder layer
5: connection terminal
51: first join part
52: second join part
53: bridge section
530: ceiling part of bridge section
531: bridge section front-side main surface
532: pier part of bridge section
54: fixing part
6: power line
60: starting point of power line
61: side opposite of side facing glass plate main surface 21 in power line 6
7: virtual line
71: center portion of first join part
72: center portion of second join part
73: middle point of virtual line 7

The invention claimed is:

1. A car window glass assembly comprising:
a car window glass plate in which a conductor layer having a predetermined pattern is formed on a glass plate main surface;
a connection terminal connected to the conductor layer via a pair of join portions formed of a first solder layer and a second solder layer each made of an indium-containing lead-free solder; and
a power line fixed to the connection terminal,
wherein the connection terminal includes:
a first join part made from a metal plate, and joined to the conductor layer via the first solder layer;
a second join part made from a metal plate, and joined to the conductor layer via the second solder layer;
a bridge section made from a metal plate, and connected to the first join part and the second join part so as to be spaced apart from the conductor layer; and
a fixing part for fixing the power line to a bridge section main surface of the bridge section,
wherein the power line extends from the fixing part along the glass plate main surface, and a starting point of the power line, at which the power line extends from the fixing part, is located on a line which passes through a middle point of a virtual line connecting a center portion of the first join part with a center portion of the second join part, and which extends vertical to the glass plate main surface, and
wherein a direction in which the power line extends is orthogonal to the virtual line.

2. The car window glass assembly according to claim 1, wherein, in the fixing part, the power line is fixed by caulking, brazing or welding.

3. The car window glass assembly according to claim 1, wherein a thickness of each of the first join part, the second join part and the bridge section is 0.3 mm to 2.0 mm.

4. The car window glass assembly according to claim 1, wherein the lead-free solder is made of an alloy containing 5-95 mass % of indium, 5-95 mass % of tin, 0-10 mass % of silver, 0-10 mass % of antimony, 0-10 mass % of copper, 0-10 mass % of zinc and 0-10 mass % of nickel.

5. The car window glass assembly according to claim 1, wherein the glass plate is made from non-reinforced glass.

6. The car window glass assembly according to claim 1, wherein the bridge section is formed with a cut-out portion.

7. The car window glass assembly according to claim 1, wherein the bridge section is formed with a cut-out portion, and the fixing part is provided to a bridge section back-side main surface.

8. The car window glass assembly according to claim 1, wherein the bridge section main surface is formed with a cut-out portion.

9. The car window glass assembly according to claim 1, wherein the fixing part is formed to fix the power line by caulking, and a longitudinal direction of the fixing part is orthogonal to a longitudinal direction of the bridge section.

10. The car window glass assembly according to claim 1, wherein a width of the virtual line is 4 mm.

11. The car window glass assembly according to claim 1, wherein a diameter of the middle point is 2 mm.

12. The car window glass assembly according to claim 1, wherein a distance between the first join part and the second joint part is 4 mm to 16 mm.

13. The car window glass assembly according to claim 1, wherein an area of the bridge section main surface is 8 $mm^2$ to 96 $mm^2$.

14. The car window glass assembly according to claim 1, wherein an area of each of a main surface of the first join part and a main surface of the second joint part is 12 $mm^2$ to 48 $mm^2$.

15. The car window glass assembly according to claim 1, wherein the direction in which the power line extends is orthogonal to the virtual line and parallel to the glass plate main surface.

* * * * *